US006852660B2

(12) United States Patent
Mitchell et al.

(10) Patent No.: US 6,852,660 B2
(45) Date of Patent: Feb. 8, 2005

(54) SOLID METALLOCENE CATALYST SYSTEM

(75) Inventors: Kent E. Mitchell, Bartlesville, OK (US); Gary L. Glass, Dewey, OK (US); L. Matthew Kirchman, Bartlesville, OK (US); Robert K. Provence, Copan, OK (US); Leigh A. Ford, Bartlesville, OK (US); Randall S. Muninger, Dewey, OK (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 156 days.

(21) Appl. No.: 10/348,555

(22) Filed: Jan. 21, 2003

(65) Prior Publication Data

US 2003/0144436 A1 Jul. 31, 2003

Related U.S. Application Data

(63) Continuation of application No. 09/805,277, filed on Mar. 13, 2001, now Pat. No. 6,534,609.

(51) Int. Cl.$^7$ ................................................ B01J 31/16
(52) U.S. Cl. ...................... 502/152; 502/103; 502/108; 526/160; 526/943; 526/904
(58) Field of Search ................. 502/103, 152, 502/108; 526/160, 943, 904

(56) References Cited

U.S. PATENT DOCUMENTS

| | | | |
|---|---|---|---|
| 4,871,705 A | | 10/1989 | Hoel |
| 5,008,228 A | | 4/1991 | Chang |
| 5,106,804 A | | 4/1992 | Bailly et al. |
| 5,169,818 A | | 12/1992 | Antberg et al. |
| 5,191,132 A | | 3/1993 | Patsidis et al. |
| 5,240,894 A | | 8/1993 | Burkhardt et al. |
| 5,393,851 A | | 2/1995 | Ewen et al. |
| 5,594,078 A | | 1/1997 | Welch et al. |
| 5,654,454 A | | 8/1997 | Peifer et al. |
| 5,705,578 A | * | 1/1998 | Peifer et al. ................. 526/160 |
| 5,770,663 A | | 6/1998 | Peifer et al. |
| 5,886,202 A | | 3/1999 | Jung et al. |

FOREIGN PATENT DOCUMENTS

| | | | |
|---|---|---|---|
| EP | 0 685 495 A1 | * | 12/1995 |
| WO | WO 98/52686 | | 11/1998 |
| WO | WO 99/29738 | | 6/1999 |

* cited by examiner

Primary Examiner—Ling-Sui Choi
(74) Attorney, Agent, or Firm—Womble Carlyle Sandridge & Rice, PLLC

(57) ABSTRACT

A solid metallocene-containing catalyst system of an organoaluminoxane, at least one metallocene having at least one olefinically unsaturated substituent and a polyolefin is disclosed. The polyolefin is formed from at least one olefin polymerized in the presence of a combination of a solution of the organoluminoxane in an aromatic liquid, the at least one metallocene, and an aliphatic liquid. The solid metallocene-containing catalyst system may also include one or more the particulate solids.

54 Claims, No Drawings

SOLID METALLOCENE CATALYST SYSTEM

CROSS REFERENCE TO RELATED APPLICATION

This application is a continuation of U.S. patent application Ser. No. 09/805,277 filed on Mar. 13, 2001, the disclosure of which is incorporated herein by reference.

FIELD OF THE INVENTION

This invention relates to a new type of solid particulate metallocene catalyst system useful for the polymerization and/or copolymerization of olefins. The invention is also related to a process for conducting polymerization of olefins using the inventive solid metallocene catalyst system.

BACKGROUND OF THE INVENTION

The term "Metallocene" as used herein refers to a derivative of cyclopentadienylidene which is a metal derivative containing at least one cyclopentadienyl component which is bonded to a transition metal. The transition metal is selected from Groups IVB, VB, and VIB, preferably IVB and VIB. Examples include titanium, zirconium, hafnium, chromium, and vanadium. A number of metallocenes have been found to be useful for the polymerization of olefins. Generally, the more preferred catalysts are metallocenes of Zr, Hf, or Ti.

Generally, in order to obtain the highest activity from metallocene catalysts, it has been necessary to use them with an organoaluminoxane cocatalyst, such as methylaluminoxane. This resulting catalyst system is generally referred to as a homogenous catalyst system since at least part of the metallocene or the organoaluminoxane is in solution in the polymerization media. These homogenous catalysts systems have the disadvantage that when they are used under slurry polymerization conditions, they produce polymer which sticks to reactor walls during the polymerization process and/or polymer having small particle size and low bulk density which limits the commercial utility.

Some attempts to overcome the disadvantages of the homogenous metallocene catalyst systems are disclosed in U.S. Pat. Nos. 5,240,894; 4,871,705; and 5,106,804. Typically, these procedures have involved the prepolymerization of the metallocene aluminoxane catalyst system either in the presence of or in the absence of a support. An evaluation of these techniques has revealed that there is still room for improvement, particularly when the catalyst is one which is to be used in a slurry type polymerization where the object is to produce a slurry of insoluble particles of the end product polymer rather than a solution of polymer which could result in fouling of the reactor. In the operation of a slurry polymerization in a continuous loop reactor it is extremely important for efficient operations to limit polymer fouling of the internal surfaces of the reactor. The term "fouling" as used herein refers to polymer buildup on the surfaces inside the reactor.

An improved type of solid metallocene catalyst composition that can be used in a slurry polymerization process was revealed in U.S. Pat. No. 5,498,581, the disclosure of which is incorporated herein by reference. That catalyst composition was prepared by combining a cocatalyst with a metallocene that had an olefinically unsaturated substituent, subjecting that mixture to prepolymerization with an olefin in the presence of a liquid to produce a solid prepolymerized catalyst, and separating the resulting prepolymerized catalyst from the liquid and the components dissolved in the liquid. Some specific variations of producing such catalysts are disclosed in WO 99/29738 and WO 98/52686, the disclosures of which are also incorporated herein by reference.

An object of the present invention is to provide yet further improvements for the making of solid catalyst systems of the type disclosed in U.S. Pat. No. 5,498,581. In accordance with another aspect of the present invention, there is provided a method for polymerizing olefins using the new improved version of such solid prepolymerized metallocene catalyst systems.

SUMMARY OF THE INVENTION

In accordance with the present invention, a solid particulate metallocene-containing catalyst system is produced by (a) combining an organoaluminoxane and at least one metallocene having at least one olefinic unsaturated substituent in an aliphatic liquid to form a liquid catalyst system, (b) conducting prepolymerization of at least one olefin in the presence of said liquid catalyst system, optionally in multiple steps, to produce a prepolymerized solid catalyst, and (c) separating the resulting solid from the liquid and the components dissolved in the liquid, said solid being the solid particulate metallocene catalyst system. The phrase "liquid catalyst system" as used herein refers to the combination of the aluminoxane, the metallocene, and the aliphatic liquid, irrespective of whether the aluminoxane and/or the metallocene are dissolved in the liquid.

In accordance with another aspect of the present invention, the resulting inventive solid particulate metallocene-containing catalyst system is employed in the polymerization of an olefin by contacting the olefin with the inventive solid particulate metallocene-containing catalyst system under suitable reaction conditions.

DETAILED DESCRIPTION OF THE INVENTION

A wide range of metallocenes are considered to be applicable to the present process. The essential feature is that the metallocene be one wherein at least one cyclopentadienyl-type ligand has a substituent having a polymerizable olefinic group. Some examples of such olefin-containing metallocenes are disclosed in U.S. Pat. No. 5,169,818 and published European Application No. 574,370. The invention is considered applicable to both bridged and unbridged metallocenes. The unbridged metallocenes can even include bridged ligands which contain two cyclopentadienyl-type radicals connected by a suitable bridging structure but wherein only one of the cyclopentadienyl-type radicals of that ligand is bonded to the transition metal. Alternatively, the olefinic substituent can be on the bridge connecting the two cyclopentadienyl-type groups.

The metallocenes of the type contemplated as useful for the present invention include those represented by the formula $R_x(Z)(Z)MQ_k$ wherein each Z bound to M and is the same or different and is a cyclopentadienyl-type ligand selected from substituted or unsubstituted cyclopentadienyl, indenyl, tetrahydroindenyl, octahydrofluorenyl, and fluorenyl ligands; R is a structural bridge linking the Z's and M is a metal selected from the group consisting of IVB, VB, and VIB metals of the periodic table, each Q is the same or different and is selected from the group consisting of hydrogen, halogens, and organoradicals; x is 1 or 0; k is a number sufficient to fill out the remaining balances of M; further characterized by the fact that at least one Z has at least one olefinically unsaturated substituent attached. In bridged metallocenes this olefinically unsaturated substituent can be a branch on the bridging unit or on one or both of the cyclopentadienyl-type groups of the bridged ligands.

When a Q is an organo radical, it can be selected from any of the organo radicals known to be suitable for metallocenes that are useful as polymerization catalysts. Some examples include aryl, alkyl, alkenyl, alkylaryl, and arylalkyl radicals. Preferably, if Q is an argano radical, the organo radical has 1 to 20 carbon atoms. A particularly preferred type of bridged metallocene includes those in which the olefinically unsaturated substituent has the formula:

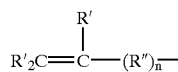

wherein R" is a hydrocarbyl diradical having 1 to 20 carbon atoms; more preferably 2 to 10; n is 1 or 0, and each R' is individually selected from the group consisting of organo radicals having 1 to 10 carbon atoms and hydrogen. Most preferably R" has at least two carbons in its main alkylene chain, i.e. it is a divalent ethylene radical or a higher homolog thereof.

Some olefinic branched bridged ligands useful for making metallocenes suitable for the present invention can be prepared by reacting a dihalo olefinic compound with an alkali metal salt of a suitable cyclopentadiene-type compound to produce a compound of the formula Z—R—Z where R is a bridge having olefinic unsaturation and wherein each Z is the same or alternatively to first produce a compound of the formula Z—R—X wherein X is a halogen and then reacting that compound with an alkali metal salt of another different cyclopentadiene-type compound to produce a compound of the formula Z—R—Z wherein the two Z's differ. Such reactions can be carried out using conditions of the type disclosed in U.S. Pat. No. 5,191,132.

An alternate technique for forming an olefinic branched bridged ligand involves reacting a carbonyl compound having olefinic unsaturation with a cyclopentadiene-type compound in the presence of a base and methanol to yield an alkenyl fulvene which is then reacted with an alkali metal salt of a cyclopentadiene-type compound, such as, for example, fluorene, to yield the unsaturated-branched-bridged ligand containing two cyclopentadienyl-type groups, i.e. fluorenyl and cyclopentadienyl. For example, one could react 5-hexene-2-one with cyclopentadiene using a procedure like that disclosed by Stone et al. in *J. Org. Chem.*, 49, 1849 (1984) to yield 6-(but-3-enyl)-6-methylfulvene which could then be reacted with fluorenyl-lithium and subsequently hydrolyzed to yield 5-cyclopentadienyl-5-(9-fluorenyl)-1-hexene, also sometimes referred to as 1-(9-fluorenyl)-1-(cyclopentadienyl)-1-(methyl)-1-(but-3-enyl) methane.

The present invention thus envisions using bridged metallocenes prepared from vinyl terminated branched bridged ligands of the formula:

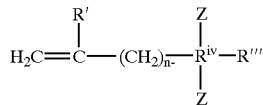

wherein n is a number typically in the range of about 0 to 20; more preferably 2-10; $R^{iv}$ is Si, Ge, C, or Sn; R''' and R' are each individually selected from hydrogen, or organo groups having 1 to 10 carbons. Currently preferred R' and R''' components are hydrogen or alkyl groups typically having 1 to 10 carbon atoms, or aryl groups typically having 6 to 10 carbon atoms. Z is a cyclopentadienyl-type radical as described earlier.

The metallocenes of such olefinically unsaturated branched-bridged ligands can be prepared by reacting the olefinically branched-bridged bis(cyclopentadienyl-type) ligand with an alkali metal alkyl to produce a divalent ligand salt that is then reacted with the transition metal compound to yield the metallocene, using the techniques generally known in the art for forming such metallocenes. See, for example, the technique disclosed in European Published Application 524,624, the disclosure of which is incorporated herein by reference.

Some typical examples of some metallocenes containing a substituent having olefinic unsaturation include 5-(cyclopentadienyl)-5-(9-fluorenyl)-1-hexene zirconium dichloride, bis(9-fluorenyl)(methyl)(vinyl)silane zirconium dichloride, bis(9-fluorenyl)(methyl)(prop-2-enyl)silane zirconium dichloride, bis(9-fluorenyl) (methyl)(but-3-enyl) silane zirconium dichloride, bis(9-fluorenyl)(methyl) (hex-5-enyl) silane zirconium dichloride, bis(9-fluorenyl) (methyl)(oct-7-enyl)silane zirconium dichloride, (cyclopentadienyl)(1-allylindenyl) zirconium dichloride, bis (1-allylindenyl) zirconium dichloride, (9-(prop-2-enyl) fluorenyl) (cyclopentadienyl) zirconium dichloride, (9-(prop-2-enyl) fluorenyl)(pentamethylcyclopentadienyl) zirconium dichloride, bis(9-(prop-2-enyl)fluorenyl) zirconium dichloride, (9-(cyclopent-2-enyl) fluorenyl) (cyclopentadienyl) zirconium dichloride, bis(9-(cyclopent-2-enyl) (fluorenyl) zirconium dichloride, 5-(2-methylcyclopentadienyl)-5-(9-fluorenyl)-1-hexene zirconium dichloride, 5-(fluorenyl)-5-(cyclopentadienyl)-1-hexene hafnium dichloride, (9-fluorenyl)(1-allylindenyl) dimethylsilane zirconium dichloride, 1-(2,7-di(alpha-methylvinyl)(9-fluorenyl))-1-(cyclopentadienyl)-1,1-dimethylmethane zirconium dichloride, 1-(2,7-di(cyclohex-1-enyl)(9-fluorenyl))-1-(cyclopentadienyl)-1,1-methane zirconium dichloride, 5(cyclopentadienyl)-5-(9-fluorenyl)-1-hexene titanium dichloride, and the like.

These various metallocenes can be prepared by reacting the necessary cyclopentadienyl-type alkali metal salt with a transition metal compound. Some examples of such reactions are disclosed in the aforementioned published EPC application no. 524,624.

The organo aluminoxane component used in preparing the inventive solid catalyst system is an oligomeric aluminum compound having repeating units of the formula:

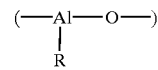

Some examples are often represented by the general formula $(R—Al—O)_n$ or $R(R—Al—O—)_nAlR^2$. In the general aluminoxane formula R is a $C_1$-$C_5$ alkyl radical, for example, methyl, ethyl, propyl, butyl or pentyl and "n" is an integer from 1 to about 50. Most preferably, R is methyl and "n" is at least 4. Aluminoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. Generally the reaction of an aluminum alkyl with a limited amount of water is postulated to yield a mixture of the linear and cyclic species of the aluminoxane.

In the first step of the present invention, the metallocene and aluminoxane are combined with an aliphatic liquid to form a liquid catalyst system. Examples of what is meant by aliphatic liquid include pentane, isopentane, hexane, octane, heptane, and the like. The amount of aliphatic liquid employed should preferably be such as to allow for good mixing in the subsequent steps and to allow for a desirable viscosity during the prepolymerization step.

It is preferred that the liquid catalyst system be prepared using an aluminoxane that is dissolved in an aromatic liquid. Examples of what is meant by aromatic liquid include benzene, toluene, ethylbenzene, diethylbenzene, and the like. The currently preferred aromatic liquid is toluene. The amount of liquid in which the aluminoxane is dissolved is not particularly critical, however the aromatic liquid is commonly used in such an amount that the aluminoxane solution would contain about 5 to about 40 weight percent aluminoxane, more preferably about 10 to about 30 weight percent.

The amount of aliphatic liquid employed in step (a) can vary over a wide range depending upon the results desired. Typically, however, the aliphatic liquid would be used in such an amount that the volume ratio of the aliphatic liquid to the aromatic solution of aluminoxane would be in the range of from about 0.5/1 to about 15/1, more preferably about 1/1 to about 13.5/1, still more preferably at least 5/1, and even still more preferably at least 6/1.

In combining the metallocene and the aluminoxane the temperature is preferably kept below that which would cause the metallocene to decompose. Typically the temperature would be in the range of −50° C. to 100° C. Preferably, the metallocene, the aluminoxane, and the liquid diluent are combined at room temperature, i.e. around 10 to 30° C. The reaction between the aluminoxane and the metallocene is relatively rapid. The reaction rate can vary depending upon the ligands of the metallocene. It is generally desired that they be contacted for at least about a minute to about 1 hour.

It is within the scope of the invention to form the liquid catalyst system in the presence of a particulate solid. Any number of particulate solids can be employed as the particulate solid. Typically the particulate solid can be any organic or inorganic solid that does not interfere with the desired end result. Examples include porous supports such as talc, inorganic oxides, and resinous support materials such as particulate polyolefins. Examples of inorganic oxide materials include oxides of metals of Groups II, III, IV or V of the Periodic Table, such as silica, alumina, silica-alumina, and mixtures thereof. Other examples of inorganic oxides are magnesia, titania, zirconia, and the like. Other suitable support materials which can be employed include such as, magnesium dichloride, and finely divided polyolefins, such as polyethylene. It is within the scope of the present invention to use a mixture of one or more of the particulate solids.

It is generally desirable for the solid to be thoroughly dehydrated prior to use, preferably it is dehydrated so as to contain less than 1% loss on ignition. Thermal dehydration treatment may be carried out in vacuum or while purging with a dry inert gas such as nitrogen at a temperature of about 20° C. to about 1000° C., and preferably, from about 300° C. to about 800° C. Pressure considerations are not critical. The duration of thermal treatment can be from about 1 to about 24 hours. However, shorter or longer times can be employed provided equilibrium is established with the surface hydroxyl groups.

Dehydration can also be accomplished by subjecting the solid to a chemical treatment in order to remove water and reduce the concentration of surface hydroxyl groups. Chemical treatment is generally capable of converting all water and hydroxyl groups in the oxide surface to relatively inert species. Useful chemical agents are for example, trimethylaluminum, ethyl magnesium chloride, chlorosilanes such as $SiCl_4$, disilazane, trimethylchlorosilane, dimethylaminotrimethylsilane, and the like.

The chemical dehydration can be accomplished by slurrying the inorganic particulate material such as, for example silica, in an inert low boiling hydrocarbon, such as for example, hexane. During the chemical dehydration treatment, the silica should be maintained in a moisture and oxygen free atmosphere. To the silica slurry is then added a low boiling inert hydrocarbon solution of the chemical dehydrating agent, such as, for example dichloroldimethylsilane. The solution is added slowly to the slurry. The temperature ranges during chemical dehydration reaction can be from about 20° C. to about 120° C., however, higher and lower temperatures can be employed. Preferably, the temperature will be about 50° C. to about 100° C. The chemical dehydration procedure should be allowed to proceed until all the substantially reactive groups are removed from the particulate support material as indicated by cessation of gas evolution. Normally, the chemical dehydration reaction will be allowed to proceed from about 30 minutes to about 16 hours, preferably, 1 to 5 hours. Upon completion of the chemical dehydration, the solid particulate material may be filtered under a nitrogen atmosphere and washed one or more times with a dry, oxygen free inert solvent. The wash solvents as well as the diluents employed to form the slurry and the solution of chemical dehydrating agent, can be any suitable inert hydrocarbon. Illustrative of such hydrocarbons are pentane, heptane, hexane, toluene, isopentane, and the like.

Another chemical treatment that can be used on solid inorganic oxides such as silica involves reduction by contacting the solid with carbon monoxide at an elevated temperature sufficient to convert substantially all the water and hydroxyl groups to relatively inactive species.

The specific particle size of the support or inorganic oxide, surface area, pore volume, and number of hydroxyl groups is not considered critical to its utility in the practice of this invention. However, such characteristics often determine the amount of support to be employed in preparing the catalyst compositions, as well as affecting the particle morphology of polymers formed. The characteristics of the carrier or support must therefore be taken into consideration in choosing the same for use in the particular invention.

It is also within the scope of the present invention to add such a particulate solid to the liquid catalyst system after it has been formed and to carry out the prepolymerization in the presence of that solid.

The amount of aluminoxane and metallocene used in forming the liquid catalyst system for the prepolymerization can vary over a wide range. Typically, however, the molar ratio of aluminum in the aluminoxane to transition metal of the metallocene is in the range of about 1:1 to about 20,000:1, more preferably, a molar ratio of about 50:1 to about 2000:1 is used. If a particulate solid, i.e. silica, is used, generally it is used in an amount such that the weight ratio of the metallocene to the particulate solid is in the range of about 0.00001/1 to 1/1, more preferably 0.0005/1 to 0.2/1.

In a particularly preferred process the aromatic solution of the aluminoxane is combined with the metallocene before being combined with the aliphatic liquid. In another preferred process, however, the aromatic solution of the aluminoxane is combined with the aliphatic liquid and then combined with the metallocene. It is also within the scope of the present invention to combine the metallocene with the aliphatic liquid and then combine that mixture with the aromatic solution of the aluminoxane.

The prepolymerization is conducted in the liquid catalyst system, which can be a solution, a slurry, or a gel in a liquid. A wide range of olefins can be used for the prepolymerization. Typically, the prepolymerization will be conducted using an olefin, preferably selected from ethylene and non-aromatic alpha-olefins, and as propylene. It is within the scope of the invention to use a mixture of olefins, for example, ethylene and a higher alpha olefin can be used for the prepolymerization. The use of, a higher alpha olefin, such as 1-butene, with ethylene is believed to increase the amount of copolymerization occurring between the olefin monomer and the olefinically unsaturated portion of the metallocene.

The prepolymerization can be conducted under relatively mild conditions. Typically, this would involve using low pressures of the olefin and relatively low temperatures designed to prevent site decomposition resulting from high concentrations of localized heat. The prepolymerization typically occurs at temperatures in the range of about $-15°$ C. to about $+110°$ C., more preferably in the range of about $+10$ to about $+30°$ C. The amount of prepolymer can be varied but typically would be in the range of from about 1 to about 95 wt % of the resulting prepolymerized solid catalyst system, more preferably about 5 to 80 wt %. It is generally desirable to carry out the prepolymerization to at least a point where substantially all of the metallocene is in the solid rather than in the liquid since that maximizes the use of the metallocene.

After the prepolymerization, the resulting solid prepolymerized catalyst is separated from the liquid of the reaction mixture. Various techniques known in the art can be used for carrying out this step. For example, the material could be separated by filtration, decantation, or by vacuum evaporation. It is currently preferred, however, not to rely upon vacuum evaporation since it is considered desirable to remove substantially all of the soluble components in the liquid reaction product of the prepolymerization from the resulting solid prepolymerized catalyst before it is stored or used for subsequent polymerization. After separating the solid from the liquid, the resulting solid is preferably washed with a hydrocarbon and then dried using high vacuum to remove substantially all the liquids and other volatile components that might still be associated with the solid. The vacuum drying is preferably carried out under relatively mild conditions, i.e. temperatures below $100°$ C. More typically the prepolymerized solid is dried by subjection to a high vacuum at a temperature of about $30°$ C. until a substantially constant weight is achieved. A preferred technique employs at least one initial wash with an aromatic hydrocarbon, such as toluene, followed by a wash with a paraffinic hydrocarbon, such as hexane, and then vacuum drying. It is within the scope of the present invention to contact the prepolymerization reaction mixture product with a liquid in which the prepolymer is sparingly soluble, i.e. a counter solvent for the prepolymer, to help cause soluble prepolymer to precipitate from the solution. Such a liquid is also useful for the subsequent washing of the prepolymerized solid.

It is also within the scope of the present invention to add a particulate solid of the type aforementioned after the prepolymerization. Thus one can add the solid to the liquid prepolymerization product before the counter solvent is added. In this manner soluble prepolymer tends to precipitate onto the surface of the solid to aid in the recovery of the filtrate in a particulate form and to prevent agglomeration during drying. The liquid mixture resulting from the prepolymerization or the inventive solid prepolymerized catalyst can be subjected to sonification to help break up particles if desired.

Further, if desired the recovered solid prepolymerized catalyst system can be screened to give particles having sizes that meet the particular needs for a particular type of polymerization.

Another option is to combine the recovered inventive solid prepolymerized catalyst system with an inert hydrocarbon, such as one of the type used as a wash liquid, and then to remove that liquid using a vacuum. In such a process it is sometimes desirable to subject the resulting mixture to sonification before stripping off the liquid.

The resulting solid prepolymerized metallocene-containing catalyst system is useful for the polymerization of olefins. Generally, it is not necessary to add any additional aluminoxane to this catalyst system. In some cases it may be found desirable to employ small amounts of an organoaluminum compound as a scavenger for poisons. The term organoaluminum compounds include compounds such as triethylaluminum, trimethylaluminum, diethylaluminum chloride, ethylaluminum dichloride, ethylaluminum sesquichloride, and the like. Trialkyl aluminum compounds are currently preferred. Also in some applications it may be desirable to employ small amounts of antistatic agents which assist in preventing the agglomeration of polymer particles during polymerization. Still further, when the inventive catalyst system is added to a reactor as a slurry in a liquid, it is sometimes desirable to add a particulate dried solid as a flow aid for the slurry. Preferably the solid has been dried using one of the methods described earlier. Inorganic oxides such as silica are particularly preferred. Currently, it is preferred to use a fumed silica such as that sold under the tradename Cab-o-sil. Generally the fumed silica is dried using heat and trimethylaluminum.

The solid catalyst system is particularly useful for the polymerization of alpha-olefins having 2 to 10 carbon atoms. Examples of such olefins include ethylene, propylene, butene-1, pentene-1, 3-methylbutene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene, and the like and mixtures thereof. The catalysts are also useful for preparing copolymers of ethylene and propylene and copolymers of ethylene or propylene and a higher molecular weight olefin.

The polymerizations can be carried out under a wide range of conditions depending upon the particular metallocene employed and the particular results desired. Although the inventive catalyst system is a solid, it is considered that it is useful for polymerization conducted under solution, slurry, or gas phase reaction conditions.

When the polymerizations are carried out in the presence of liquid diluents obviously it is important to use diluents which do not have an adverse effect upon the catalyst system. Typical liquid diluents include propane, butane, isobutane, pentane, hexane, heptane, octane, cyclohexane, methylcyclohexane, toluene, xylene, and the like. Typically the polymerization temperature can vary over a wide range, temperatures typically would be in a range of about $-60°$ C. to about $300°$ C., more preferably in the range of about $20°$ C. to about $160°$ C. Typically the pressure of the polymerization would be in the range of from about 1 to about 500 atmospheres or even greater. The inventive catalyst system is particularly useful for polymerizations carried out under particle form, i.e., slurry-type polymerization conditions.

The polymers produced with this invention have a wide range of uses that will be apparent to those skilled in the art from the physical properties of the respective polymers. Applications such as molding, films, adhesives, and the like are indicated.

A further understanding of the present invention, its various aspects, objects and advantages will be provided by the following examples.

EXAMPLE I

Two experiments were carried out to evaluate the effect of using an aliphatic liquid in forming the liquid catalyst system instead of using only toluene to form the liquid catalyst system. In both cases the preparation of the solid particulate prepolymerized catalyst systems involved the employment of a dried particulate silica which had been treated with trimethylaluminum.

In the first experiment, 1.5 grams of the silica was charged to a reaction vessel along with 6 milliliters of toluene. Then 10 milliliters of a toluene solution containing 10 weight percent methylaluminoxane, obtained from Albemarle, was charged. Then 0.035 gram of metallocene was charged. This resulting mixture was then subjected to prepolymerization employing 0.975 gram of ethylene. The resulting prepolymerized solid catalyst particles were filtered, washed two times with toluene, washed two times with hexane, and then vacuum dried. The resulting prepolymerized catalyst system was then employed in the polymerization of ethylene and the observed activity was 9649 grams of polyethylene per gram of catalyst.

In a second experiment, which involves the present invention, the same technique was used for forming the solid prepolymerized catalyst system, however, instead of using 6 milliliters of toluene, 6 milliliters of hexane was employed, and the amount of metallocene employed was 0.0279 gram. The amount of ethylene used in the prepolymerization was 0.9817. The metallocene in both experiments was 1-(9-fluorenyl)-1-(cyclopentadienyl)-1-(but-3-enyl)-1-(methyl) methane zirconium dichloride. The prepolymerized catalyst system prepared using hexane instead of toluene, when evaluated under the same conditions as was used with the other catalyst system, revealed an activity of 14,433 grams of polymer per gram of catalyst. This demonstrates that substituting hexane for the toluene when forming the liquid catalyst system can result in the solid prepolymerized catalyst system having more activity.

EXAMPLE II

Another series of prepolymerized catalyst systems were prepared using the same metallocene as used in Example I. In this series no particulate silica was employed. The metallocene employed in this case was a 30 weight percent toluene solution of methylaluminoxane obtained from Akzo. A comparison of the conditions employed in these four experiments is summarized in the following Table:

TABLE I

| A | B | C | D |
|---|---|---|---|
| Charge 6 ml hexane | Charge 8 ml hexane | Charge 9 ml toluene | Charge 0.0114 g metallocene |
| Charge 2 ml 30% Akzo MAO | Charge 2 ml 30% Akzo MAO | Charge 0.02709 g metallocene | Charge 5 ml toluene |
| Charge 0.01056 g metallocene | Charge 0.0119 g metallocene | Charge 2 ml 30% Akzo MAO | Charge 5 ml hexane |
|  |  |  | Charge 2 ml 20% Akzo MAO |

TABLE I-continued

| A | B | C | D |
|---|---|---|---|
| Charge 0.4971 g ethylene | Charge 0.5091 g ethylene | Charge 0.5060 g ethylene | Charge 0.5091 g ethylene |
| Wash 2 times with toluene | Wash 2 times with toluene | Wash 2 times with toluene | Wash 2 times with toluene |
| Wash 2 times with hexane | Wash 2 times with hexane | Wash 2 times with hexane | Wash 2 times with hexane |
| Vacuum dry | Vacuum dry | Vacuum dry | Vacuum dry |
| 26,429 g/g activity | 32,310 g/g activity | 14,758 g/g activity | 14,257 g/g activity |

The Table demonstrates that one obtains a catalyst having improved activity if one uses an aliphatic liquid in forming the liquid catalyst system. A comparison of catalysts A and B reveals that increasing the amount of aliphatic liquid employed can result in a further increase in activity.

EXAMPLE III

Two additional experiments were conducted to evaluate the effect of the order of addition of the metallocene, aluminoxane, and hexane. In preparing these two catalysts the same metallocene was used that was employed in Example I and no silica was employed. The only difference in the two catalyst preparations was that in one the methyl aluminoxane toluene solution and the metallocene were combined and then added to the hexane, whereas, in the other the metallocene was added to the hexane and then combined with the toluene solution of the methyl aluminoxane. It was noted that the prepolymerized solid catalyst produced using the latter method was more active than the catalyst produced using the former method, i.e. 26,575 grams of polymer per gram of catalyst as compared to 15,418 grams of polymer per gram of catalyst; however, the prepolymerized catalyst prepared by mixing the metallocene with the hexane before the addition of the toluene solution of methyl aluminoxane had significantly higher levels of fines than the prepolymer prepared in the other method. The level of fines produced was such that the prepolymer prepared by first combining the methyl aluminoxane and the metallocene would have been the preferred catalyst.

EXAMPLE IV

Another series of experiments were carried out in an attempt to find a combination of steps which would give a good balance of both catalyst particle size distribution and activity. Again the metallocene that was employed was the metallocene of Example I and no silica was employed. In these experiments the metallocene was mixed with the toluene solution of methyl aluminoxane prior to being combined with the hexane. In one experiment the amount of hexane employed was 6 milliliters. In another experiment, the amount of hexane employed was 10 milliliters. In the third experiment the mixture of the metallocene and the aluminoxane was combined with 6 milliliters of hexane and then prepolymerization was conducted using a portion of the ethylene. Then an additional 6 milliliters of the hexane was added and additional ethylene was added for the production of additional prepolymer. The results of these comparisons are illustrated in the following Table:

TABLE II

|  | E<br>6 ml<br>Hexane | F<br>10 ml<br>Hexane | G<br>2–6 ml Hexane<br>Charges |
|---|---|---|---|
| +10 mesh | 1.8% | 40.6% | 6.0% |
| 20 mesh | 5.8% | 7.0% | 13.2% |
| 40 mesh | 53.4% | 6.2% | 45.6% |
| 60 mesh | 26.6% | 15.9% | 26.1% |
| 100 mesh | 9.9% | 19.9% | 7.7% |
| 200 mesh | 5.5% | 9.7% | 1.3% |
| pan | 0.1% | 0.6% | 0.0% |
| Productivity | 18,072 g/g | 27,989 g/g | 22,517 g/g |

The Table reveals that, as was noticed in other experiments, the employment of higher levels of hexane resulted in a catalyst having higher activity but with poorer catalyst particle size distribution. Example G, on the other hand, reveals a good balance of both polymer particle size distribution and catalyst activity.

EXAMPLE V

One preferred catalyst preparation involved the employment of the same metallocene as used in Example I and no silica. The catalyst was prepared by adding 2 liters of a 13 weight percent toluene solution of methyl aluminoxane to a reactor which was cooled to about 25° C. and agitated. Then 19.7 grams of the metallocene was added followed by 6.6 liters of hexane. The resulting liquid catalyst system was then reacted with 226 grams of ethylene at 25° C. to form prepolymer. After the formation of prepolymer from that ethylene, an additional 6.6 liters of hexane was added to the reactor and an additional 583 grams of ethylene was added to the reactor and the prepolymerization was continued at a temperature of about 25° C. After the prepolymerization was complete, the resulting solid catalyst particles were transferred to a filter dryer and filtered. They were subsequently washed twice with hexane and dried under a vacuum until substantially free of toluene. The resulting prepolymerized catalyst had a catalyst activity of 15,487 grams of polymer per gram of catalyst and 96 weight percent of the polymer was in the 20 mesh range.

EXAMPLE VI

This describes a particularly preferred method for preparing an inventive catalyst composition. The metallocene employed is the same metallocene as used in Example I and no silica was employed. The procedure involves pressurizing and depressurizing a reactor with nitrogen five times, charging 2.456 liters of a toluene solution of methyl aluminoxane, allowing the reactor to cool to about 25° C., adding about 21.26 grams of the metallocene compound, pressurizing and depressurizing the reactor with nitrogen 3 times, charging 13 liters of hexane to the reactor, allowing the reactor to cool to about 25° C. Then the reactor is pressurized with 20 psi ethylene and held for 20 minutes. The temperature during this period would be in the range of about 23° C. to about 33° C. After the 20 minutes of prepolymerization the reactor would be depressurized and charged with 13 liters of hexane, then the reactor repressurized with ethylene and prepolymerization continued. Subsequent to the prepolymerization the reactor would be depressurized and the solid prepolymerized catalyst recovered by filtering, washing, and drying.

That which is claimed is:

1. A solid prepolymerized catalyst system produced by a process comprising:
   (a) combining an organoaluminoxane dissolved in an aromatic liquid, at least one metallocene having at least one olefinically unsaturated substituent, and an aliphatic liquid to form a liquid catalyst system;
   (b) conducting prepolymerization of at least one olefin in the presence of the liquid catalyst system to produce a prepolymerized solid catalyst; and
   (c) separating the resulting solid from the liquid and components dissolved in the liquid,
   wherein the solid prepolymerized catalyst system has an activity greater than a second catalyst formed by polymerizing the at least one olefin in the presence of the organoaluminoxane, the at least one metallocene, and either the aromatic liquid or the aliphatic liquid; and
   wherein the activity of the solid prepolymerized catalyst system and the activity of the second catalyst are evaluated under like conditions.

2. The solid prepolymerized catalyst system according to claim 1, wherein the liquid catalyst system is formed by combining the aromatic solution of the organoaluminoxane with the at least one metallocene and then combining that resulting composition with an aliphatic liquid.

3. The solid prepolymerized catalyst system according to claim 2, wherein the aliphatic liquid is hexane.

4. The solid prepolymerized catalyst system according to claim 3, wherein the liquid catalyst system is formed by combining the organoaluminoxane dissolved in toluene with the at least one metallocene and then combining that resulting composition with hexane.

5. The solid prepolymerized catalyst system according to claim 4, wherein the hexane contains a solid particulate support.

6. The solid prepolymerized catalyst system according to claim 5, wherein said particulate support is silica.

7. The solid prepolymerized catalyst system according to claim 1, wherein the liquid catalyst system contains a solid particulate support.

8. The solid prepolymerized catalyst system according to claim 7, wherein the aromatic solution of the organoaluminoxane is added to the aliphatic liquid and then the at least one metallocene is added to that resulting combination.

9. The solid prepolymerized catalyst system according to claim 8, wherein the particulate support is an inorganic oxide.

10. The solid prepolymerized catalyst system according to claim 8, wherein the particulate support is silica.

11. The solid prepolymerized catalyst system according to claim 10, wherein the prepolymerization involves the prepolymerization of ethylene.

12. The solid prepolymerized catalyst system according to claim 11, wherein the prepolymerization involves the prepolymerization of a mixture of ethylene and 1-butene.

13. The solid prepolymerized catalyst system according to claim 1, wherein the liquid catalyst system is formed by combining the aromatic solution of the organoaluminoxane with the aliphatic liquid and then combining that resulting composition with the at least one metallocene.

14. The solid prepolymerized catalyst system according to claim 1, wherein the liquid catalyst system is formed by combining the aromatic solution of the organoaluminoxane with the at least one metallocene in the aliphatic liquid.

15. The solid prepolymerized catalyst system according to claim 1, wherein step (a) is conducted in the presence of a bridged metallocene having olefinic unsaturation in a branch extending outwardly from the bridge, the ligand of said metallocene having the formula:

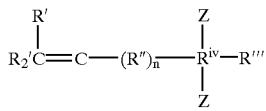

wherein n is 1 or 0; $R^{iv}$ is Si, Ge, C, or Sn; each R' is individually selected from hydrogen or hydrocarbyl radicals having 1 to 10 carbons; R" is selected from hydrocarbyl diradicals containing 1 to 10 carbons; R''' is selected from hydrogen or hydrocarbyl groups containing 1 to 10 carbons; and each Z is the same or different and is selected from substituted or unsubstituted cyclopentadienyl, indenyl, tetrahydroindenyl, or fluorenyl radicals.

16. The solid prepolymerized catalyst system according to claim 15, wherein 5-(9-fluorenyl)-5-(cyclopentadienyl)-hexene-1 zirconium dichloride is employed.

17. The solid prepolymerized catalyst system according to claim 1, wherein the metallocene is selected from 5-(cyclopentadienyl)-5-(9-fluorenyl)-1-hexene zirconium dichloride, bis(9-fluorenyl)(methyl)(vinyl)silane zirconium dichloride, bis(9-fluorenyl)(methyl)(prop-2-enyl)silane zirconium dichloride, bis(9-fluorenyl)(methyl)(but-3-enyl) silane zirconium dichloride, bis(9-fluorenyl)(methyl)(hex-5-enyl) silane zirconium dichloride, bis(9-fluorenyl)(methyl)(oct-7-enyl)silane zirconium dichloride, (cyclopentadienyl)(1-allylindenyl) zirconium dichloride, bis(1-allylindenyl) zirconium dichloride, (9-(prop-2-enyl) fluorenyl)(cyclopentadienyl) zirconium dichloride, (9-(prop-2-enyl)fluorenyl)(pentamethylcyclopentadienyl) zirconium dichloride, bis(9-(prop-2-enyl)fluorenyl) zirconium dichloride, (9-(cyclopent-2-enyl)fluorenyl)(cyclopentadienyl) zirconium dichloride, bis(9-(cyclopent-2-enyl)fluorenyl) zirconium dichloride, 5-(2-methylcyclopentadienyl)5-(9-fluorenyl)-1-hexene zirconium dichloride, 5-(fluorenyl)-5-(cyclopentadienyl)-1-hexene hafnium dichloride, (9-fluorenyl)(1-allylindenyl) dimethylsilane zirconium dichloride, 1-(2,7-di(alpha-methylvinyl)-(9-fluorenyl)-1-(cyclopentadienyl)-1,1-dimethylmethane zirconium dichloride, or 1-(2,7-di (cyclohex-1-enyl) 9-fluorenyl))-1-(cyclopentadienyl)-1,1-methane zirconium dichloride.

18. The solid prepolymerized catalyst system according to claim 1, wherein the volume ratio of the aliphatic liquid to the solution of the organoaluminoxane in step (a) is in the range of from about 5/1 to about 13.5/1.

19. The solid prepolymerized catalyst system according to claim 18, wherein step (b) is carried out by prepolymerizing a first amount of ethylene and then adding more aliphatic liquid and then prepolymerizing a second amount of ethylene and wherein the amount of aliphatic liquid added after the first prepolymerization step is about 5/1 to about 13.5/1 times the volume of the organoaluminoxane solution used in step (a).

20. The solid prepolymerized catalyst system according to claim 19, wherein at least one of the metallocenes is 5-(fluorenyl)-5-(cyclopentadienyl)-hexene-1 zirconium dichloride.

21. A solid metallocene-containing catalyst system comprising:
an organoaluminoxane;
at least one metallocene having at least one olefinically unsaturated substituent; and
a polyolefin comprising at least one olefin polymerized in the presence of a combination of a solution of the organoaluminoxane in an aromatic liquid, the at least one metallocene, and an aliphatic liquid,
wherein the solid metallocene-containing catalyst system has an activity greater than a second catalyst formed by polymerizing the at least one olefin in the presence of the organoaluminoxane, the at least one metallocene, and either the aromatic liquid or the aliphatic liquid; and
wherein the activity of the solid prepolymerized catalyst system and the activity of the second catalyst are evaluated under like conditions.

22. The catalyst system as claimed in claim 21, wherein the organoaluminoxane is an oligomeric compound having repeating units of the formula:

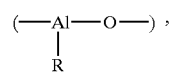

wherein R is a $C^1$–$C^5$ alkyl radical.

23. The catalyst system as claimed in claim 21, wherein the organoaluminoxane has the formula $(R-Al-O)_n$ or $R(R-Al-O-)_nAlR_2$, wherein R is a $C_1$–$C_5$ alkyl radical and n is an integer from 1 to about 50.

24. The catalyst system as claimed in claim 23, wherein R is methyl and n is at least 4.

25. The catalyst system as claimed in claim 21, wherein the at least one metallocene is a compound of the formula $R_x(Z)(Z)MQ_k$, wherein:
each Z is bound to M, is the same or different, and is a cyclopentadienyl-type ligand selected from substituted or unsubstituted cyclopentadienyl, indenyl, tetrahydroindenyl, octahydrofluorenyl, or fluorenyl ligands;
R is a structural bridge linking the Z's;
M is a metal selected from IVB, VB, and VIB metals of the periodic table;
each Q is the same or different and is selected from hydrogen, halogens, or organoradicals;
x is 1 or 0; and
k is a number sufficient to fill out the remaining balances of M.

26. The catalyst system as claimed in claim 25, wherein at least one Z has at least one olefinically unsaturated substituent attached.

27. The catalyst system as claimed in claim 26, wherein the at least one metallocene is a bridged metallocene and the olefinically unsaturated substituent is a branch on the bridging unit or on one or both of the cyclopentadienyl-type groups of the bridged ligands.

28. The catalyst system as claimed in claim 25, wherein Q is an organo radical selected from aryl, alkyl, alkenyl, alkylaryl, or arylalkyl radicals.

29. The catalyst system as claimed in claim 25, wherein Q is an argano radical having 1 to 20 carbon atoms.

30. The catalyst system as claimed in claim 21, wherein the at least one metallocene is a bridged metallocene having an olefinically unsaturated substituent of the formula:

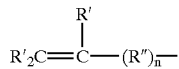

wherein R" is a hydrocarbyl diradical having 1 to 20 carbon atoms; n is 1 or 0, and each R' is individually selected from organo radicals having 1 to 10 carbon atoms or hydrogen.

31. The catalyst system as claimed in claim 30, wherein R" is a hydrocarbyl diradical having 2 to 10 carbon atoms.

32. The catalyst system as claimed in claim 30, wherein R" has at least two carbons in its main alkylene chain.

33. The catalyst system as claimed in claim 21, wherein the at least one metallocene is selected from 5-(cyclopentadienyl)-5-(9-fluorenyl)-1-hexene zirconium dichloride, bis(9-fluorenyl)(methyl)(vinyl)silane zirconium dichloride, bis(9-fluorenyl)(methyl)(prop-2-enyl)silane zirconium dichloride, bis(9-fluorenyl) (methyl)(but-3-enyl) silane zirconium dichloride, bis(9-fluorenyl)(methyl) (hex-5-enyl) silane zirconium dichloride, bis(9-fluorenyl) (methyl)(oct-7-enyl)silane zirconium dichloride, (cyclopentadienyl)(1-allylindenyl) zirconium dichloride, bis (1-allylindenyl) zirconium dichloride, (9-(prop-2-enyl) fluorenyl) (cyclopentadienyl) zirconium dichloride, (9-(prop-2-enyl) fluorenyl)(pentamethylcyclopentadienyl) zirconium dichloride, bis(9-(prop-2-enyl)fluorenyl) zirconium dichloride, (9-(cyclopent-2-enyl) fluorenyl) (cyclopentadienyl) zirconium dichloride, bis(9-(cyclopent-2-enyl) (fluorenyl) zirconium dichloride, 5-(2-methylcyclopentadienyl)-5-(9-fluorenyl)-1-hexene zirconium dichloride, 5-(fluorenyl)-5-(cyclopentadienyl)-1-hexene hafnium dichloride, (9-fluorenyl)(1-allylindenyl) dimethylsilane zirconium dichloride, 1-(2,7-di(alpha-methylvinyl)(9-fluorenyl))-1-(cyclopentadienyl)-1,1-dimethylmethane zirconium dichloride, 1-(2,7-di(cyclohex-1-enyl)(9-fluorenyl))-1-(cyclopentadienyl)-1,1-methane zirconium dichloride, or 5(cyclopentadienyl)-5-(9-fluorenyl)-1-hexene titanium dichloride.

34. The catalyst system as claimed in claim 21, wherein the aliphatic liquid is present an amount to produce a volume ratio of the aliphatic liquid to the aromatic solution of organoaluminoxane in the range of from about 0.5/1 to about 15/1.

35. The catalyst system as claimed in claim 21, wherein the aliphatic liquid is present an amount to produce a volume ratio of the aliphatic liquid to the aromatic solution of organoaluminoxane in the range of about 1/1 to about 13.5/1.

36. The catalyst system as claimed in claim 21, wherein the aliphatic liquid is present an amount to produce a volume ratio of the aliphatic liquid to the aromatic solution of organoaluminoxane of at least 5/1.

37. The catalyst system as claimed in claim 21, wherein the aliphatic liquid is present an amount to produce a volume ratio of the aliphatic liquid to the aromatic solution of organoaluminoxane of at least 6/1.

38. The catalyst system as claimed in claim 21, wherein the aromatic liquid is selected from benzene, toluene, ethylbenzene, or diethylbenzene.

39. The catalyst system as claimed in claim 21, wherein the aliphatic liquid is selected from pentane, isopentane, hexane, octane, or heptane.

40. The catalyst system as claimed in claim 21, wherein the at least one olefin is selected from ethylene or non-aromatic alpha-olefins.

41. The catalyst system as claimed in claim 21, wherein the at least one olefin is a mixture of olefins.

42. The catalyst system as claimed in claim 21, wherein the at least one olefin is a mixture of ethylene and an alpha olefin having 3 or more carbon atoms.

43. The catalyst system as claimed in claim 42, wherein the alpha olefin is 1-butene.

44. The catalyst system as claimed in claim 21, further comprising a particulate solid or a mixture of particulate solids.

45. The catalyst system as claimed in claim 44, wherein the particulate solids are porous.

46. The catalyst system as claimed in claim 44, wherein the particulate solids are talc, inorganic oxides, resinous particulates, or any combination thereof.

47. The catalyst system as claimed in claim 44, wherein the particulate solids are selected from one or more oxides of metals of Groups II, III, IV or V of the Periodic Table.

48. The catalyst system as claimed in claim 44, wherein the particulate solids are selected from silica, alumina, silica-alumina, magnesia, titania, zirconia, magnesium dichloride, finely divided polyolefins, or any combination thereof.

49. The catalyst system as claimed in claim 21, wherein the at least one metallocene is 5-(9-fluorenyl)-5-(cyclopentadienyl)-hexene-1 zirconium dichloride.

50. The catalyst system as claimed in claim 21, wherein the at least one metallocene is 5-(9-fluorenyl)-5-(cyclopentadienyl)-hexene-1 zirconium dichloride, the organoaluminoxane is methylaluminoxane, the aromatic liquid is toluene, and the aliphatic liquid is hexane.

51. The catalyst system as claimed in claim 21, wherein the at least one metallocene is a bridged metallocene having a vinyl terminated branched bridged ligand of the formula:

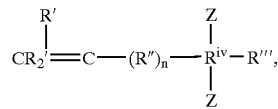

wherein n is 1 or 0; R''' is Si, Ge, C, or Sn; each R' is individually selected from hydrogen or hydrocarbyl diradicals having 1 to 10 carbons; R" is selected from hydrocarbyl radicals containing 1 to 10 carbons; R''' is selected from hydrogen or hydrocarbyl groups containing 1 to 10 carbons; and each Z is the same or different and is selected from substituted or unsubstituted cyclopentadienyl, indenyl, tetrahydroindenyl, octahydrofluorenyl, or fluorenyl radicals.

52. The catalyst system as claimed in claim 51, wherein n is 1 and R" is a saturated alkylene diradical having 2 to 10 carbon atoms in its main chain.

53. The catalyst system as claimed in claim 51, wherein $R^{iv}$ is C.

54. The catalyst system as claimed in claim 51, wherein $R^{iv}$ is Si.

* * * * *